United States Patent

[11] 3,614,394

[72] Inventor Theodore S. Bindshedler
Pompano Beach, Fla.
[21] Appl. No. 285,550
[22] Filed May 31, 1963
[23] Division of Ser. No. 576,475, Apr. 5, 1945, abandoned, which is a continuation of application Ser. No. 237,241, July 17, 1951, now abandoned.
[45] Patented Oct. 19, 1971
[73] Assignee Burroughs Corporation
Detroit, Mich.

[54] DATA RECORDS, AND DATA RECORDING AND UTILIZING METHODS AND MEANS
15 Claims, 6 Drawing Figs.

[52] U.S. Cl. 235/61.9 R, 235/61.11 D, 101/93 C
[51] Int. Cl. G06k 3/00, G06k 7/08, B41j 27/16
[50] Field of Search 101/93 RC; 235/61.114

[56] References Cited
UNITED STATES PATENTS

| | | | |
|---|---|---|---|
| 2,608,621 | 8/1952 | Peterson | 179/100.2 |
| 2,254,933 | 9/1941 | Bryce | 235/61.11 |
| 2,427,383 | 9/1947 | Bryce | 235/61.11 |
| 2,337,533 | 12/1943 | Hofgaard | 235/61.12 |
| 2,744,031 | 5/1956 | Mumma | 117/36 |

FOREIGN PATENTS

| | | | |
|---|---|---|---|
| 538,016 | 7/1941 | Great Britain | |

*Primary Examiner*—Daryl W. Cook
*Attorneys*—Paul W. Fish, Charles S. Hall and Ward, McElhannon, Brooks & Fitzpatrick ABSTRACT: An accounting machine includes means for magnetically recording a new balance on an accounting form and for later sensing the recording to enter such balance into the accumulator of the machine. The magnetic recording is made by impressing deposits of magnetic material from a ribbon onto the form, which deposits are configured so as to be visually readable to facilitate manual checking.

INVENTOR.
THEODORE S. BINDSHEDLER

BY Fidler, Crouse + Beardsley

ATTORNEYS

INVENTOR.
THEODORE S. BINDSHEDLER
BY
ATTORNEYS

DATA RECORDS, AND DATA RECORDING AND UTILIZING METHODS AND MEANS

This application is a division of application Ser. No. 576,475 filed Apr. 5, 1956, now abandoned, which in turn is a continuation of application Ser. NO. 237,241, filed July 17, 1951, now abandoned.

This invention relates to improvements in accounting machines of the kind adapted to receive a plurality of entries, to compute therefrom a balance or result, to produce a record thereof including at least a portion of a usual visually readable form and at least a portion which is automatically readable, to subsequently automatically read the latter portion of the record, and reenter the so recorded previous balance result into its computing mechanism and, after accumulation of one or more further entries, to compute therefrom a new balance or result. Machines of that character possess the advantage of providing, in the form of a removable record, storage of the results of previous computations, which results may be reentered into the machine for new computations without the need of mental and manual intervention of a machine operator to read the previous result and set it up on a keyboard or the like, thereby both saving time and eliminating the possibility of such errors as the operator might make.

Prior machines of the above-indicated character have been provided with one recording means for producing a visually readable record or record portion and, additionally, a second recording means for producing the automatically readable record or record portion, thereby not only increasing the complexity and cost of the machine, but also resulting in the need for larger records having a visually readable portion and another automatically readable record portion, thereby increasing the cost of record materials and storage.

An object of the present invention is to produce an improved accounting machine which will provide all of the advantages resulting from an automatic reading of records of results of previous computations but with less complicated and less costly mechanism and without the need for substantially increased size and cost of record materials and storage of records.

A further object of the invention is to provide an accounting machine of the above-indicated kind comprising a new combination of data entering, computing, recording and automatic reading mechanisms and record wherein an improved record having both visually and automatically readable elements is produced by a single recording means thereby eliminating the need for a second recording means of the prior machines.

A further object of the invention is to produce an improved accounting machine of the indicated kind characterized by improved ease, rapidity and reliability of operation.

The present invention also provides and the improved machine utilizes a novel magnetic ink as hereinafter disclosed.

In the machine of the present invention a magnetic record is produced by a novel method as hereinafter disclosed as a part of my invention.

The improved machine produces a novel magnetic record on essentially nonmagnetic record media such as ordinary paper record sheets as hereinafter disclosed as a part of my invention.

A further object of the present invention is to provide novel methods and means of producing and utilizing data records of a new form, which produce compact records, and which lend themselves to easy and comparatively inexpensive incorporation into the present day mechanical accounting and bookkeeping practices and other practices employing typed or printed records.

Another object of the present invention is to provide novel means and methods of producing data records of a new form which can easily be incorporated into present practices employing typed or printed records to any desired extent to eliminate human reading of certain records or portions of records in which the greatest number of the human errors occur.

Another object is to provide a novel method and means of producing magnetic records adapted to be easily incorporated in business machines of the kind presently employed in producing typed or printed records, nd with a minimum amount of alteration and expense.

Another object is to provide a novel form of magnetic record and means for reading and utilizing such records.

Another object is to provide a novel form of magnetic record and means for reading such records and controlling computing, accounting or bookkeeping in accordance with such records and adapted to be incorporated in accounting and bookkeeping machines of kinds presently employed in accounting and bookkeeping with printed records.

A further object is to provide a novel form of magnetic record which can be produced at less cost and with more convenience than prior forms of magnetic records.

A further object is to provide a novel form of record which combines the usual visually readable data representations and magnetic data representations and which can be produced with a convenience and low expense comparing favorably with the production of ordinary typed or printed records.

Further objects and advantages of the invention will become apparent from the following detailed description with reference to the accompanying drawings in which.

Figures 1, 2, 3:
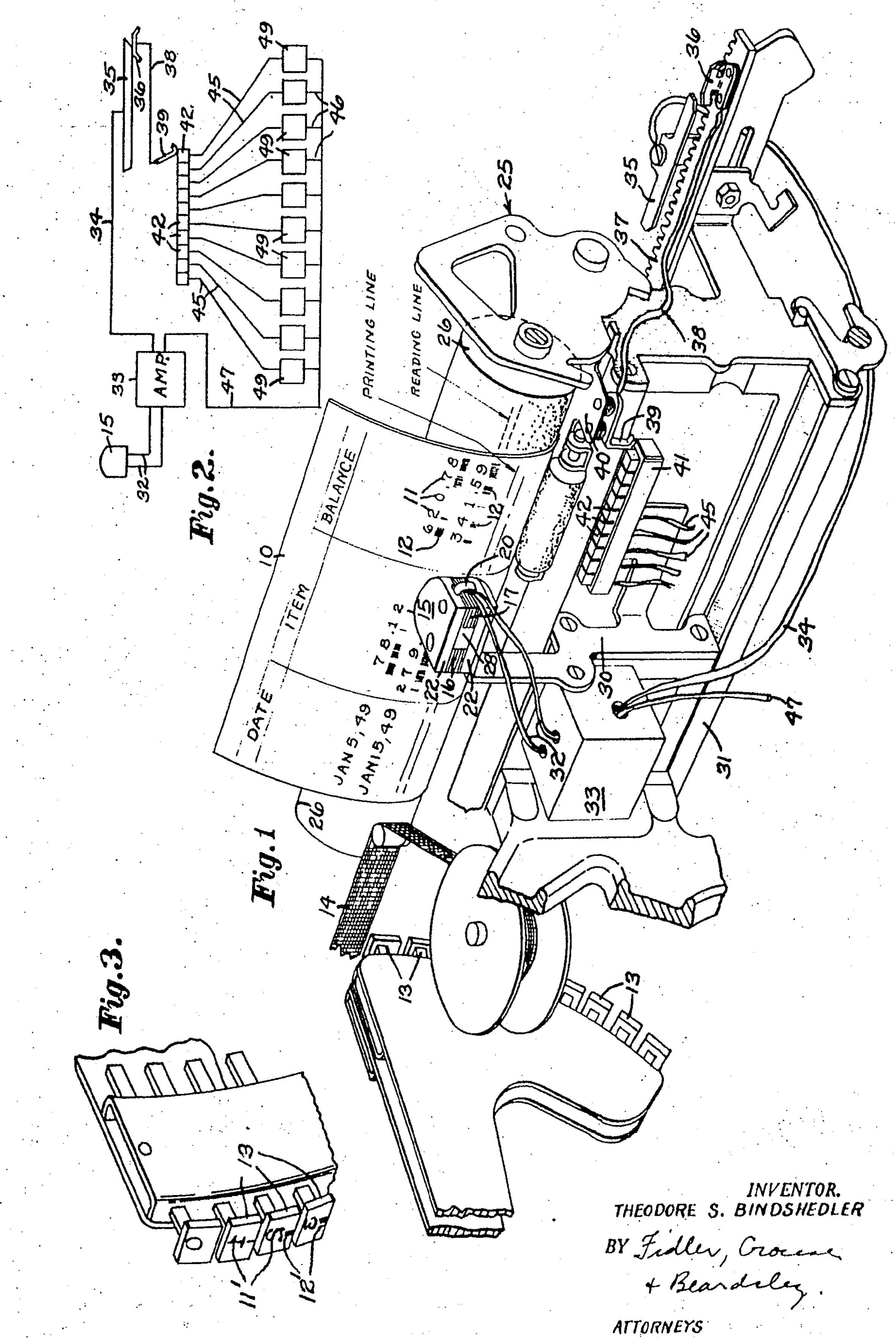
FIG. 1 is a perspective view of portions of an accounting machine embodying the present invention.
FIG. 2 is a diagram of the electrical circuit of the means employed in the machine of FIG. 1 for automatically entering an old balance therein.
FIG. 3 is a detail showing a portion of a type bar of the machine of FIG. 1.
Figure 4:
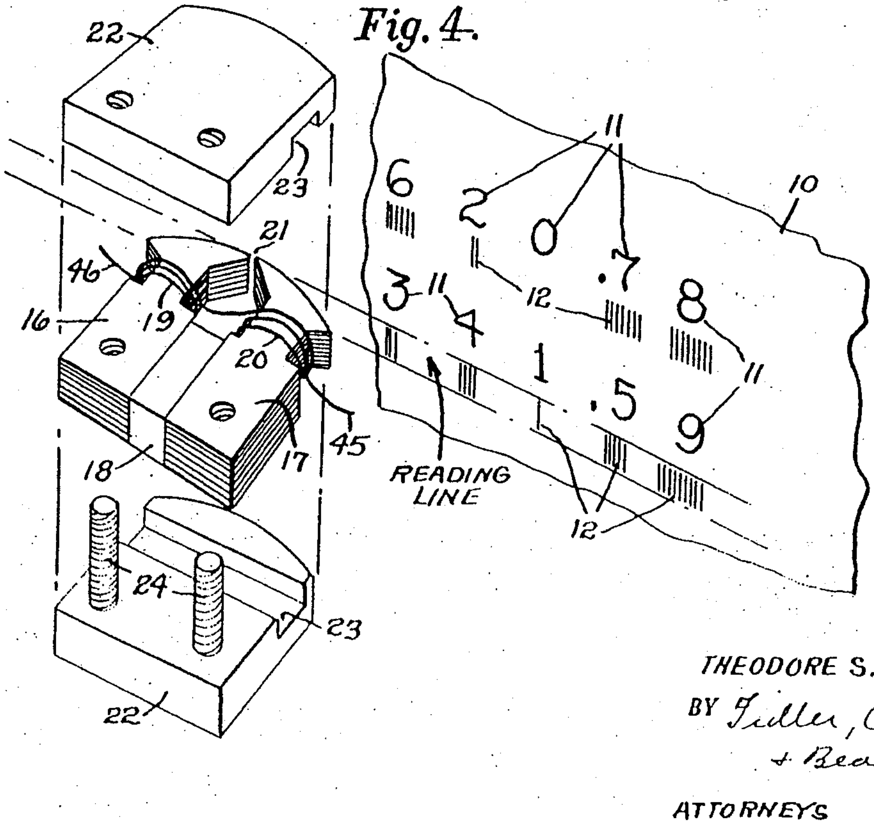
FIG. 4 shows somewhat schematically the construction of a pickup head employed in the machine of FIG. 1.

A portion of a novel record in accordance with the present invention is shown in FIGS. 1 and 4 in which 10 is a record form of the usual character as employed in the production of the usual printed, visually readable records. Imprinted upon the record form 10 are data representations 11 comprising characters of a usual form of notation, such as arabic numerals of the decimal system numbers, together with additional data representations 12. At least the representations 12 are formed of a magnetic ink, consisting of a large proportion of extremely finely divided magnetic material such as high permeability iron, steel or magnetic alloys, uniformly dispersed in a carrier which may be of the nature of viscous fluid carriers as commonly employed in known typewriter ribbon inks and the like. As one example, the ink may consist of from 10 to 14 parts by volume of extremely finely powdered magnetic material of high permeability and 10 to 6 parts by volume of a carrier fluid such as a "printing oil" or a mixture of oleic and lauric acids preferably in the proportion of about five parts of oleic acid to one part of lauric acid. In lieu of a viscous fluid carrier, a waxy carrier of the nature of those used in the production of "carbon" papers may be used. After uniformly dispersing therein a large proportion, say from 50 to 70 percent by volume, of very finely divided paramagnetic material of relatively high permeability, paper or other suitable ribbons or sheets may be coated therewith in the manner and by the means usually employed in the production of "carbon" papers. Dyes and pigments such as are usually included in typewriter ribbon inks and in "carbon" coatings are not necessary in the magnetic inks or magnetic "carbon" coatings as the finely divided magnetic material therein is of sufficiently deep and dark color to render printing produced with ribbons and papers impregnated or coated with such magnetic inks or coatings easily visually readable. Magnetic inks of the character of those disclosed in the application of Ernst W. Rickmeyer, Ser. No. 237,155, filed July 17, 1951, now abandoned and inking ribbons impregnated with such inks are preferred. The representations 12 denote the same data or information as the numerals 11 appearing directly above them in FIGS. 1 and 4.

Whether the arabic numerals 11 or other characters of usual notation are printed with the same magnetic ink with which the data representations 12 are printed, or are printed with any ordinary typewriter ribbon ink or the like is immaterial. Magnetic ink of the kind described above is of sufficiently dark color to produce easily visually readable records on ordinary paper record materials. Both types of data representations 11 and 12 may be printed in a typewriter or other printing business machine, such as the machine of FIG. 1, equipped with type members correspondingly formed with type faces 11' and 12' for both forms of data representations as shown for example in FIG. 3, and employing an inking ribbon 14 impregnated with magnetic ink of the kind described above.

In the illustrated embodiment of the invention, the magnetic data representations 12 are in the form of groups of laterally spaced short vertical lines located immediately below the corresponding numerals 11. Such data representations 12, formed of deposits of magnetic ink as described above, are adapted to be read automatically during the movement of the record 10 bearing such representations relative to an electromagnetic pickup head 15. Conveniently, and to adapt them for reliable automatic reading by the pickup head 15 describe hereinafter, each of the magnetic data representations 12 provided for the digits "1" to "9" inclusive comprises a number of parallel vertical line elements equal to the value of the respective digit, i.e., one line element for the digit "1," two line elements for "2," etc. In this instance no magnetic representation 12 is required for the cipher "0."

The pickup head 15 may be of the construction shown generally in FIG. 4. It has a magnetic core comprising legs 16 and 17 each of which may be formed of a small stack of laminations of magnetic material of high permeability, such as transformer steel. To adapt the pickup head for reading data representations 12 formed of magnetic ink in which the magnetic material is magnetically "soft," i.e., of low coercivity, the pickup head includes means, such as a highly permanently magnetized insert 18 of a material of high coercivity, such as an "Alnico" (registered trademark), to produce a relatively high magnetomotive force in the core. In a pickup head for reading data representations 12 formed of magnetic ink in which the powdered magnetic material is magnetically "-hard," i.e., having high values of coercivity and remanence, and magnetized transversely to the lengths of the line elements after deposit on the record form 10, the insert 18 may be of the same material as the legs 16 and 17 and integral with the latter. The legs 16 and 17 are preferably laterally notched near their pole ends to receive output windings 19 and 20. The pole ends of the legs 16 and 17 are formed with convex cylindric and faces separated by a small air gap 21 having dimensions of the order of the dimensions of the individual line elements of the data representations 12. The distance between the opposing pole faces of the legs 16 and 17 is referred to herein as the length dimension of the airgap 21. The pickup head is held in assembled relation between a pair of nonmagnetic end plates 22 grooved at 23 to accommodate the coils 19 and 20 and secured together as by screws 24 passing through the core portions 16 and 17.

During relative movement between the pickup head 15 and record 10 in such manner as to maintain the vertical line elements of the data representations 12 parallel to the airgap 21 while transporting those line elements successively across the gap 21, the reluctance of the magnetic circuit of the pickup head which resides principally in the gap 21, is very substantially reduced each time that the gap 21 is substantially bridged by one of the deposits of magnetic ink constituting the line elements of the data representations 12, and again returns to its normal value as such deposit of magnetic ink is transported from the gap 21. The magnetic flux produced in the core of the pickup head 15 by the magnet 18 varies inversely to the variation of reluctance and induces varying voltages in the windings 19 and 20. When the data representations 12 are formed of "hard" magnetic material and magnetized transversely to the lengths of the line elements, they will constitute individual magnets which will produce flux changes in the core of the pickup head 15 when each bridges or substantially bridges the gap 21 and a cycle of alternating voltage will be induced in the windings 19 and 20 as magnetized line element is transported across the gap 21.

Portions of an accounting machine equipped to utilize magnetic records of the above-described kind are shown in FIGS. 1 and 3. The machine chosen for an illustrative example is a well know Burroughs "High Keyboard" machine having a front-feed traveling paper carriage 25 and automatic carriage opening means of the kind disclosed in U.S. Pat. No. 2,202,595 of Robert L. Muller. The platen roller 26 in the carriage 25 is of the usual kind surfaced with rubber or other firm, resilient substantially nonmagnetic or diamagnetic material. The present machine is also provided with means, not shown herein, of the kind disclosed in U.S. Pat. No. 2,340,372 of Arthur J. Fettig, which, when the machine is caused to operate while the paper carriage 25 is in a predetermined one of its columnar positions, automatically interrupts the operation of portion of the machine, including the differential actuator racks and the totalizer or register engaging and disengaging mechanisms thereof, at the end of the forward stroke of the cycle and then causes the carriage to be moved to another columnar position, after which the return stroke of the cycle of operation is completed. For the purposes of the present invention, the machine has the usual full complement of column stops on the carriage, three in the present example, instead of only the column stops numbered 41 in the Fettig patent for the two end columnar positions of the carriage. Furthermore, control means disclosed in the Fettig patent, including the carriage tabulating and return controls, are so adjusted that when the machine is operated with the paper carriage located in a first or starting position corresponding to the usual "Old Balance Pickup" position and well ahead of the item entering columnar position, the machine operation will be interrupted at the end of the forward stroke, the paper carriage will then tabulate into the item entering columnar position, after which the cycle of operation of the machine will be completed.

As for the purposes of the present invention, the printing mechanism should not operate in machine cycles initiated with the paper carriage in the above-mentioned starting position, the usual "hammer block" control is adjusted in a manner well understood by those skilled in the art to suppress printing in such machine cycles. The multiple printing control rolls 360, 370 and 377 and all other provisions of the Fettig patent for causing multiple operations of the printing mechanism during movement of the paper carriage may be omitted from the present machine, the printing mechanism of which may be completely like the usual printing mechanisms of other Burroughs "High Keyboards" machine except that the printing types 13 are formed with type portions 11' and 12' to print both arabic numerals and representations 12 composed of vertical line elements.

In accordance with the present invention, the machine is also provided with a pickup head 15 like that described above, mounted on a bracket 30 secured to the stationary members 31 of the carriage races. The location of the pickup head 15, as shown in FIG. 1, is such that as the paper carriage tabulates from the above-mentioned starting columnar position (corresponding to the usual "Old Balance Pickup" position) to the "Item" columnar position, the data representations 12 in the "Balance" column at the reading line one line-space above the current printing line on the form 10 supported by the platen 26 will be carried past the air gap 21 of the pickup head successively and in very close proximity thereto. The output of the pickup head 15 is led over conductors 32 to an amplifier of known form enclosed in a case 33 suitably supported on the machine frame. One output terminal of the amplifier is connected through a conductor 34 to a conducting rail member 35 supported upon but insulated from the fixed frame of the machine. A brush 36 is mounted upon the usual carriage-return rack member 37 of the carriage in insulated relation thereto and in such position thereon that it makes sliding electrical contact with the conducting rail member 35 while data representations 12 in the "Balance" column on the form 10 in the carriage are passing the airgap 21 in the pickup head during tabulation of the paper carriage from its starting position to its "Item" columnar position. The brush 36 is connected through a conductor 38 to another brush member 39 secured to and insulated from a portion of the usual lower platen shield 40 on the carriage. A straight line commutator unit 41 supported on an arm of the bracket 30 comprises a line of mutually insulated commutator segments 42 equal in number to the number of numeral orders of the machine. The brush 39 and commutator unit 41 are so relatively positioned on the carriage and on the fixed bracket 30, respectively, that while the data representation 12 for each order of an amount in the "Balance" column of the form 10 in the carriage is passing the airgap 21 in the pickup head 15, during tabulation of the paper carriage from its starting position to the "Item" columnar position, the brush 39 is in sliding contact with the commutator segment 42 for the corresponding numeral order of the machine. The segment 42, which is at the rightward end of the commutator 41 in FIG. 1 and which is the first to be contacted by the brush 39 during such tabulation of the carriage, is associated with the highest numeral order, and the segment 42, at the leftward end of the commutator, is associated with the highest numeral order. Each commutator segment 42 is connected to one input lead 45 of a means 49, described hereinafter, adapted to control the computing, totalizer or registering means of the corresponding numeral order of the machine in accordance with the data representation 12 passing the gap 21. The other input lead 46 (FIGS. 2 and 5) of each of such control means is connected to a common return conductor 47 connected to the remaining output terminal of the amplifier.

Figure 5:
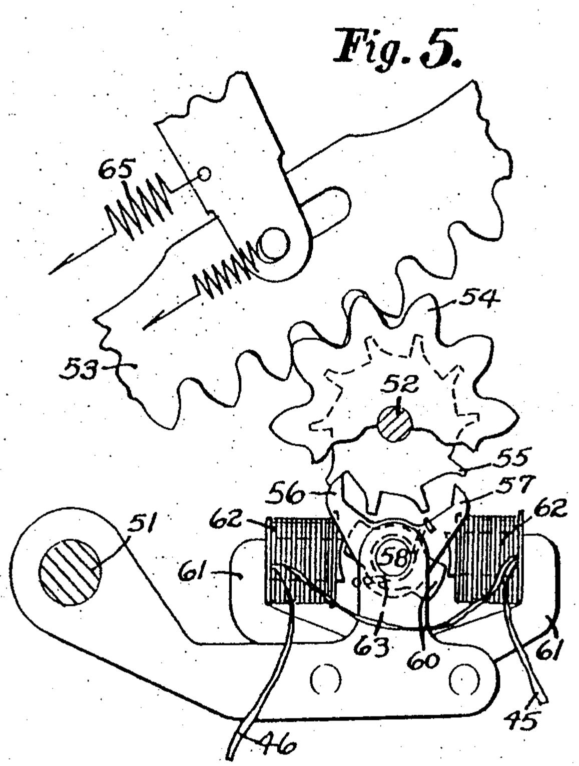
FIG. 5 shows a means for controlling one order of the computing mechanism of the machine of FIG. 1.

The above-mentioned computing control means 49 may be of various forms or kinds. A preferred form of such device 49, shown in FIG. 5, is adapted to take advantage of certain conditions which exist in the above-described machine as the paper carriage is tabulated from its starting position to its "Item" entering columnar position during the interruption of the machine cycle at the end of the forward stroke thereof. As is well known, total-taking is performed on the Burroughs "High Keyborad" machine by releasing the usual differential actuator racks from their "0" stops for movement from their normal "0" positions while the pinions of a totalizer are in mesh with such actuator racks during the forward stroke of a machine cycle. Unless the totalizer pinions are already in their "0" positions, the actuator racks are moved by spring tension toward their "9" positions and rotate the pinions backward toward their "0" positions where the pinions are arrested by engagement of their usual transfer projections with projections on the transfer pawls an thus also arrest the meshed actuator racks at positions corresponding to the amounts standing on the totalizer pinions at the commencement of the machine cycle. Such movements of the actuator racks also index the usual tube-carriers to print the total taken from the totalizer. At the beginning of the return stroke of the cycle, before the actuator racks start to return to their "0" positions, the totalizer pinions are unmeshed from the actuator racks so that they remain in their "0" positions.

In the present machine, in the machine cycle which is interrupted at the end of the forward stroke while the paper carriage 25 tabulates from its starting position to the "Item" columnar position, the actuator racks 53 are released from their zero stops as in a total taking operation, but instead of being controlled by the pinions of a totalizer from which a total is to be taken, the movements of the actuator racks from their "0" positions are controlled by the devices 49 in the form of escapement devices one of which is shown in FIG. 5, which are operated by electrical pulses transmitted through the conductors 45 and 46. These escapement mechanisms 49 are mounted in a frame which may replace the multiple register frame shown in U.S. Pat. No. 1,911,768 to Walter J. Pasinski. The shift 51 corresponds to the shaft 80 of the Pasinski patent and is controlled and operated by the mechanism by which the shaft 80 of the Pasinski patent is controlled and operated. The shaft 52 is supported, as is the shaft 72 of the Pasinski patent in arms (not shown herein) secured to the shaft 51.

For each of the usual actuator racks 53, a pinion 54 (FIG. 5) is freely rotatably mounted on the shaft 52 in alignment with the respective actuator rack. To each pinion 54, an escapement ratchet wheel 55 is secured to rotate with the pinion. The ratchet wheels 55 are controlled by two-armed escapement pawls 56, 57 rockably mounted on a shaft 58 supported in arms 59 secured to the shaft 51. Each escapement pawl 56, 57 is secured to an armature bar 60 also rockably mounted on the shaft 58 between the poles of a generally C-form core 61 of an electromagnet supported between the arms 59. Windings 62 on the pole portions of the core 61 receive energizing current pulses through the leads 45 and 46. The armature 60 and pawl 56, 57 are normally positioned as shown in FIG. 5 by a light tension spring 63. Each time the electromagnet receives an energizing pulse through the leads 45, 46, the armature 60 is rocked against the tension of the spring 63 into alignment with the poles of the core 61, thereby rocking the pawl 56, 57 to enter the end of its arm 57 between two teeth of the ratchet wheel 55 and disengaging the end of the arm 56 from the ratchet wheel to release the latter and the pinion 54 for rotation wheel to release the latter and the pinion 54 for rotation through one tooth space by movement of the actuator rack 53 through one tooth space by its spring 65. When the pinion 54 has been rotated a little less than one tooth space, a tooth of the ratchet 55 engages the arm 57 of the escapement pawl 56, 57, preventing completion of the full tooth space movement of the pinion 54 and rack 53 until the electromagnet 61, 62 is deenergized and then aiding the spring 63 to return the pawl 56, 57 and the armature 60 to normal position.

It will be apparent that the number of operations of the above-described escapement for each of the actuator racks 53 and the number of tooth spaces through which the associated rack 53 will be permitted to be advanced by its spring 65 will correspond to the number of magnetic line elements of the data representations 12 which pass the gap 21 of the pickup head 15 while the brush 39 contacts the particular commutator segment 42 connected to the electromagnet 61, 62 which controls that escapement.

The rotary position of the shaft 51 is normally such that the pinions 54 are normally in a lowered position and out of mesh with the racks 53. The shaft 51 is rockable to engage the pinions 54 with and disengage them from the actuator racks 53 at the proper times in machine cycles by the means disclosed in the Pasinski patent. Such means, which is shown in the Pasinski patent as being manually conditionable to cause the corresponding shaft 80 of that patent to be rocked in proper timing for taking totals from the multiple registers of that patent, is also conditionable automatically by control rolls on the paper carriage to cause the said shaft to be rocked in such total-taking timing. During the times in which the pinions 54 are unmeshed from the actuator racks 53, they may be held in positions for easy proper meshing with the racks by any suitable means (not shown herein) such as a bail similar to the bail 142 of U.S. Pat. 1,778,506 to Walter J. Pasinski. As in well known Burroughs "High Keyboard" machines which have been on the market and in wide use for many years, the carriage-controlled total-taking control means effects the release of the actuator racks 53 from their zero stops at the beginning of the cycle in which the shaft 51 is to be rocked in total-taking timing. In the present machine, the known total-taking control rollers (not shown herein) are placed in such positions on the paper carriage that the shaft 51 is rocked in total-taking timing and the actuator racks 53 are released from their zero stops in each cycle of operation of the machine which is initiated while the paper carriage is in its starting position.

A brief consideration of the operation of the above described machine in the performance of a simple kind of work, such as accounts receivable posting, will serve as an illustrative example of the utility of the invention. Those who are skilled in the art will readily understand that the invention may also be utilized to great advantage in many varied kinds of "mechanical" accounting and in other work involving the keeping and using of data-records. At the conclusion of the posting of each account receivable, in the following example, the paper carriage of the machine is located in its starting position and is in opened condition to permit the operator to remove the ledger card for the previously posted account and to insert into the carriage the ledger card 10 for the next account to be posted. The carriage may then be closed, whereupon the machine will be in the condition shown in FIG. 1, ready for the posting of such next account. The first required operation is to enter the last previous balance of the account into the computing mechanism of the machine. Formerly, it was necessary for the operator to read the amount of such balance from the "Balance" column of the ledger card 10 and correctly enter such amount on the amount keys of the machine before depressing the usual motor bar to initiate a cycle of operation of the machine. In the present example, however, the operator will merely depress the usual motor bar (not shown), whereupon the machine will operate through the forward stroke of the cycle, at which point the cycle of operation is momentarily interrupted and the carriage tabulates to the "Item" columnar position and, in doing so, moves the brush 39 into contact with each of the commutator segments 42, successively, from right to left. While the magnetic line elements of the data representation 12 of the highest order digit of the last balance printed on the card 10—in this instance the digit "3" of the balance "341.59"—are passing the gap 21 of the pickup head 15, the brush 39 will have sliding contact with the commutator segment 42 for the hundreds-of-dollars order of the machine. As the three line elements of the representation 12 beneath the digit "3" pass the gap 21, three cycles of alternating voltage are induced in the windings 19 and 20 of the pickup head and are conducted to the input terminals of the amplifier in the case 33. This amplifier is of a well known kind, the output of which is in the form of a single direct current pulse for each full cycle of alternating input voltage. As the brush 39 is in contact with the segment 42 for the hundreds-of-dollars order, the windings 62 of the escapement device for the hundreds-of-dollars order are energized three times in rapid succession, permitting the associated pinion 54 to move through three tooth-spaces and allowing the hundreds-of-dollars order rack 53 to move from its "0" position to its "3" position. Similarly, as the line elements of the data representation 12 associated with each of the other digits of the last balance printed in the "Balance" column of the ledger card 10 pass the gap 21, the brush 39 will be in contact with the segment 42 connected with windings 62 of the escapement device for the corresponding numerical order so that each escapement will be operated a number of times, corresponding to the number of such line elements composing to such data representation 12. Thus, during the tabulation of the paper carriage toward the "Item" columnar position, each of the actuator racks 15 will move form its "0" position to a position corresponding to the value of the digit in the corresponding order of the last printed balance in the "Balance" column.

After the data-representation 12, if any, for the lowest or pennies order of the printed balance passes the gap 21 and the carriage arrives at its "Item" columnar position, the mans holding the machine in its partially operated condition is released under control of the paper carriage as disclosed in the Fettig patent and the machine performs the return stroke of its cycle of operation. At the beginning of that return stroke, a totalizer, like the upper registering mechanism comprising the pinions 20 and 21 of the above-mentioned Pasinski Pat. No. 1,778,506 and operated and controlled by mechanism also disclosed in that patent, is in engagement with the actuator racks 53, after which the latter are returned to their "0" positions. Thereby, the amount of the last printed balance in the "-Balance" column of the form 10, which was scanned or read by the pickup head 15 during the tabulation of the carriage, is entered into the registering mechanism.

Upon completion of the above described cycle of operation, the machine is ready for entry of the item to be posted to the account. Such entry is made in the usual way, the operator setting the amount of the item on the keyboard and giving the machine a cycle of operation, in the course of which the item is printed in the "Item" column on card 10 and entered into the registering mechanism and the carriage is tabulated to the "Balance" columnar position. Simultaneously, as the amount of the item is printed, the date may also be printed as is usual in the operation of machines of this type. The registering mechanism now contains the total of the previous balance and the just-entered item, so that when the machine is conditioned for total-taking and given a cycle of operation, such total or new balance is printed in the "Balance" column of the form 10, the registering mechanism being cleared and the paper carriage opened and returned to its first position. As the paper carriage is in open condition and the shield 40 carrying the brush 39 is in raised position, the brush 39 will not contact any of the commutator segments 42 during the return movement of the carriage.

In printing the new balance of the account in the "Balance" column on the form 10, both the arabic figures 11 and the magnetic data-representations 12 corresponding to the amount of that new balance printed so that such balance may be entered into the machine automatically as an old balance pickup during a subsequent posting to the same account. As no means has been provided for eliminating the printing of the representations 12 in the "Item " column, such representations will also be printed in association with the arabic numerals appropriate to the amounts printed in that column but that is of no consequence to the operation of the above described machine because the brush 39 is out of contact with the commutator segments 42 while the "Item" column of the form 10 is passing the pickup head 15. However, the printing of the representations 12 in the "Item " column may easily be eliminated by employing any usual form of ribbon shift mechanism adjusted and controlled to raise the lower edge of the ribbon to a position intermediate the arabic numerals 11 and the representations 12 during the time of printing in the "Item " column.

Figure 6:
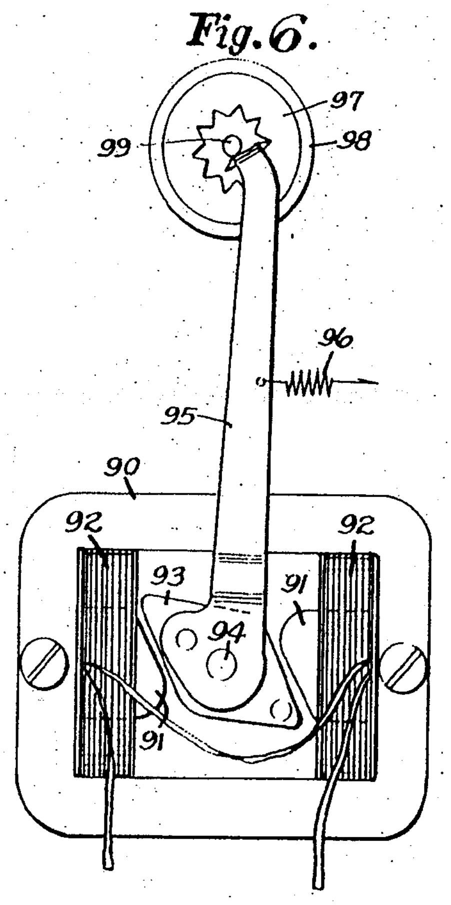
FIG. 6 shows another form of means for controlling computing, printing, indicating and other utilization means.

From the foregoing, various ways of applying the present invention to other forms of accounting, bookkeeping and other business machines will be readily apparent. In lieu of escapement devices 49, such as that shown in FIG. 5, the output of the amplifier may be utilized o operate step-by-step motors. One example of a suitable step-by-step drive means is shown in FIG. 6 and comprises a laminated magnetic field structure 90 having inwardly directed spaced pole projections 91 on which energizing windings 92 are positioned. Between the field poles 91, a laminated magnetic armature assembly 93 is rotatably mounted on a shaft 94. An arm 95 secured at its lower end to the armature 94 is urged clockwise by a spring 96 so that a laterally turned upper end portion of the arm 95 normally is pressed rightwardly between two teeth of an internally toothed disk 97 secured to an element 98 rotatable on a shaft 99. With the field poles 91 and armature 93 shaped as shown in FIG. 6, the armature 93 and arm 95 will be rocked counterclockwise against the tension of the spring 96 each time it receives an energizing pulse from the amplifier 33. As the laterally turned upper end of the arm moves leftwardly, its leftward edge will engage the under side of a tooth of the disk 97 and rotate the latter through a little less than one tooth space so that when, upon termination of the energizing pulse, the spring 96 returns the arm 95 clockwise, the rightward edge of the laterally bent upper edge of the arm 95 will act on the upper edge of a tooth of the disk 97 and cam the latter through the remainder of a full tooth space increment of rotation.

The element 98 may be a gear adapted to drive any means such as a computing means, printer indexing means or indicating means, or the element 98 may itself be constituted an indicator dial, a type wheel or by a counter or totalizer wheel. For example, the elements 98 of a series of step-by-step drive devices like that of FIG. 6 may be constituted by gears replacing the gear wheel E2 of U.S. Pat. No. 1,326,504 to Allen A. Horton for driving the registering mechanism disclosed in that patent.

It will be apparent to those skilled in the art that various other modifications can be made within the scope of the appended claims.

I claim:

1. In a cyclically operable calculating machine having a frame, a computing mechanism, amount differential actuators cooperable with said computing mechanism to enter amounts therein and draw totals therefrom, a printing mechanism including type members indexable under the control of said differential actuators in accordance with amounts entered into and totals drawn from said computing mechanism and having digit printing type portions thereon, a nonmagnetic, record-receiving member, means to removably support said record-receiving member, said record support means and said printing mechanism being mounted on said frame for columnar tabulating and return movement of one relative to the other with said record-receiving member in record-receiving position relative to said type members, means to effect such relative movement in a cycle of operation of the machine, and type impression inking means between said type members and said record-receiving member for inking the impressions on said record member of the indexed digit printing type portions, the combination of number significant groups of small parallel, closely spaced, linear impression elements on said type members with the linear elements in each group spaced in the direction of said relative movement and the several groups located to be brought to a printing position together with the type potions for the corresponding digits, a transferable magnetic ink composition on at least a portion of said linking means for inking at least the impressions on said record-receiving member of the indexed groups of linear impression elements of said type members to produce thereby a magnetically sensible record comprising number significant groups of parallel, spaced, small, linear magnetic deposits on said nonmagnetic record member, an electromagnetic sensing means mounted in fixed relation to said printing mechanism oat one side thereof and in sensing proximity to said record member to sense said linear magnetic deposits as they are transported past said sensing means during said relative movement and having an electrical output, electrically controlled means for each of said differential actuators to control movement thereof for amount entering operation of said computing mechanism, and electric circuit means controlled by the movable one of said record support means and printing mechanism to place said electrically controlled means for each of said differential actuators successively under control of said sensing means as successive groups of said magnetic deposits are sensed.

2. In a cyclically operable calculating machine having a computing mechanism, amount differential actuators cooperable with said computing mechanism to enter amounts therein and draw totals therefrom, a printing mechanism including type members indexable under control of said differential actuators in accordance with amounts entered into and totals drawn from said computing mechanism and having digit printing type portions thereon, a record paper, a paper carriage to support said record paper in printing relation to said type members and movable in columnar tabulating and return directions relative to said printing mechanism, means to effect such relative movement in a cycle of operation of the machine, and type impression inking means between said type members and the record paper supported on said carriage for inking the impressions on said record paper of the indexed digit printing type portions, the combination of number significant groups of small, parallel, closely spaced, linear impression elements on said type members with the linear elements in each group spaced in the direction of said relative movement and the several groups located to be brought to a printing position together with the type portions for the corresponding digits, a transferable magnetic ink composition on at least a portion of said inking means for inking at least the impressions on said record paper of the indexed groups of linear impression elements of said type members to produce thereby a magnetically sensible record comprising number significant groups of parallel, spaced, small, linear, magnetic deposits on the record paper supported on said carriage, an electromagnetic sensing means mounted in fixed relation to said printing mechanism at one side thereof and in sensing proximity to said record paper on said carriage to sense said linear magnetic deposits as they are transported past said sensing means during movement of said carriage and having an electrical output, electrically controlled means for each of said differential actuators to control movement thereof for amount entering operation of said computing mechanism, and electric circuit means including a commutator means controlled by said carriage in its movement to place said electrically controlled means for each of said differential actuators successively under control of said sensing means as successive groups of said magnetic deposits are sensed.

3. In a calculating machine having a computing mechanism, a multidenominational series of amount differential actuators cooperable with said computing mechanism for entering amounts therein and drawing totals therefrom, relatively movable record-supporting means and printing mechanism, said printing mechanism including a multidenominational series of type members indexable under control of respective ones of said differential actuators in total taking, a nonmagnetic record form supported on said record-supporting means, inking means including an ink ribbon supported between said type members and said record form, the combination of a quantity of pressure transferable magnetic ink composition carried by said ribbon, type elements on said type members including groups of spaced small projections to cause groups of spaced small masses of said magnetic ink to transfer from said ribbon onto said record form in denominational positions in a line thereon, a sensing device stationary relative to said printing mechanism and having a magnetic core with an electrical output winding thereon and a gap in said core in a position adjacent the path of travel, during a portion of the movement of said record support, of the small spaced masses of magnetic ink on the record form on said support, commutating means including relatively movable contact parts mounted in fixed relation to said printing mechanism and said record support respectively, electrically energized control means cooperating with each of said actuators to control the amount differential positioning thereof in an amount entering operation, and circuit means connected with said output coil, said commutation means and said control means to energize said control means for the actuators of the several denominational orders successively in accordance with the small masses of magnetic ink in the successive denominational positions on said record form passing said gap.

4. In a computing machine, the combination of computing mechanism, recording means including type members controlled by said computing mechanism, a printable nonmagnetic record medium having a plain record receiving surface, means to support said nonmagnetic record medium in print-receiving and relatively movable relation to said type members, an inking ribbon, means to position a portion of said ribbon in inking relation to said type members and record medium, an offsettable magnetic ink carried by said inking ribbon and comprising a large proportion of finely divided magnetic material of relatively high permeability, groups of closely spaced parallel linear elements on said type members to offset from said ribbon to said record medium number-representative groups of small linear deposits of said magnetic ink in a line on said surface of said record medium, with said linear elements in each group and the several groups also spaced along said line, an electromagnetic pickup device having an output winding and a magnetic core with a gap therein and mounted with said gap closely adjacent said record medium for passage of said magnetic ink deposits of each group and the successive groups of deposits in said line on said record medium successively across said gap during relative movement of said record medium electrically controlled means to enter values into said computing mechanism, and electric circuit means connected with said output winding and with said electrically controlled means to enable the output of said winding to control said computing mechanism in accordance with the values represented by the magnetic ink deposits of each of the successive groups in said line on said record medium.

5. A recording computing machine according to claim 4, wherein said computing mechanism includes a denominational series of movable value indexing members, said recording means includes a denominational series of type member carriers carrying said type members and each indexable by a respective one of said value indexing members to position said type members selectively at said line on said record medium, said electrically controlled means includes a series of electrically energizable devices each operable to control value-indexing movements of respective ones of said value indexing members and the type member carriers indexed thereby, and said circuit means includes commutator means operable by relative movement of said record medium and pickup device to render said electrically energizable devices successively operable under a control of said output winding in accordance with groups of magnetic ink deposits passing the gap of said pickup device.

6. A machine according to claim 5, wherein the type members of each of said denominational series of carriers are formed to offset value-significant numbers of discrete, spaced deposits of said magnetic ink of size and shape approximately the size and shape of said gap from said ribbon onto said record medium, said carriers being spaced along said line so that in a predetermined position of said record medium relative to said carriers, the ink deposits offset by type members of respective ones of said carriers will be placed in respective ones of a series of denominational positions along said line, and said commutator means including a series of contact members connected with respective ones of said electrically energizable devices and so arranged that during a predetermined portion of the movement of said record medium relative to said pickup device, each of said electrically energizable devices will be rendered operative while magnetic ink deposits in the corresponding denominational position along said line are passing said gap.

7. In a cyclically operable record-controlled and printing computing machine having amount differential actuator members operating in machine cycles in accordance with amounts entered into and totals taken from the machine, a support for a record paper, printing mechanism including type members indexable by said actuator members in accordance with said amounts and totals, and inking means cooperating with said type members and a paper disposed on said support to ink impressions of said type members on said paper, the combination of a supply of magnetic ink carried by said inking means, value-representing impression elements on said type members for offsetting onto said paper value-representing magnetically sensible deposits of said magnetic ink, a magnetic pickup, said pickup and said paper being relatively movable mounted to enable said pickup to scan said value-representing deposits of magnetic ink on said paper during relative movement between said paper and said pickup, and means controlled by said pickup and controlling said differential actuator members in accordance with values represented by said magnetic ink deposits on said paper to reenter into the machine the value represented by said deposits.

8. In a computing machine for keeping ledger accounts on ledger sheets in a form including both a visably readable record and a magnetically sensible record of balances of said accounts, computing mechanism including means indexable in accordance with amounts entered and totals drawn, a printing mechanism including types indexed by said indexable means, means to support a nonmagnetic ledger sheet in printing relation to said printing mechanism, a carrier of magnetic ink cooperating with said types and the ledger sheet, said types having impression elements to form on said ledger sheet inked impressions of usual visually readable characters, and groups of small closely spaced impression elements to offset on to said ledger sheet groups of small individually magnetically sensible deposits of said magnetic ink, a magnetic pickup device adjacent said support means, and means controlled by said pickup device to control said computing means to enter amounts therein, said support means being movable to transport the groups of individually magnetically sensible deposits of magnetic ink of a recorded balance on said ledger sheet past said pickup device to effect entry of said balance into said computing means and subsequently present a new portion of said ledger sheet in printing relation to said printing mechanism to receive prints of the characters and the groups of individually magnetically sensible magnetic ink deposits representative of a new balance of the ledger account.

9. A machine comprising a support for a record having spaced, discrete magnetic elements, a pickup device including a magnetic core formed with an airgap, an electrical output winding on said core, said support and pickup device being relatively movable to cause passage of said magnetic elements in succession across said airgap, commutation means operable by relative movement between said support and pickup device, a plurality of differentially movable members, electrically energizable control means for each of said members to control the positioning thereof, and circuit means controlled by said pickup means and said commutation means to energize said control means successively in accordance with the output of said pickup means during relative movement between said support and pickup means.

10. A computing machine comprising record scanning means including a magnetic core having a gap therein, and an electrical output winding on said core, means to support a record having spaced magnetic elements for movement relative to said scanning means to cause the magnetic elements of the supported record to pass said gap in succession, computing mechanism including denominational series of members each movable to a plurality of value-representing positions, electrically energizable control means for each of said members to control the positioning thereof, switching means including portions movable relatively to each other in accordance with relative movement between said record supporting means and scanning means, and circuit means connected with the output winding of said scanning means, said switching means and said control means to energize the control means for the several denominational orders and thereby control the positioning of the several movable members successively in accordance with the output of said scanning means in successive portions of the relative movement between said scanning means and said record-supporting means.

11. In a cyclically operable record-controlled printing and computing machine having amount differential actuator members operating in machine cycles in accordance with the amounts entered into and totals taken from the machine, a support for a record paper, printing mechanism including type members indexable by said actuator members in accordance with said amounts and totals, and inking means cooperating with said type members and a paper disposed on said support to ink impressions of said type members onto said paper, the combination of a supply of magnetic ink carried by said inking means, value-representing impression elements on said type members for offsetting onto said paper value representing, magnetically sensible deposits of said magnetic ink, a magnetic pickup, said pickup and said paper support being relatively movable mounted to enable said pickup to scan said value-representing deposits of magnetic ink on said paper during relative movement between said paper support and said pickup, and means controlled by said pickup and controlling said differential actuators in accordance with the values represented by said magnetic ink deposits on said paper to reenter into the machine the value represented by said deposits.

12. The combination set forth in claim 11 wherein said printing mechanism and said pickup are fixedly mounted on the frame of said machine and said support comprises a carriage movably mounted on said frame.

13. In a computing and printing machine, the combination of a calculating mechanism responsive to data supplied thereto for making certain computations and establishing totals, a support for a record paper, a printing mechanism movably mounted relative to said paper support for printing said totals on a paper disposed on said support, said printing mechanism including type members having value-representing impression elements thereon, an inking means and a supply of magnetic ink for said inking means whereby value-representing deposits of magnetic material are offset by said members onto said paper, a magnetic pickup relatively movable with respect to said paper to sense said deposits during relative movement between said paper and said pickup and to produce electric signals representative of the values represented by said deposits, and means responsive to said electric signals for entering said values into said calculating mechanism.

14. In a computing and printing machine, the combination of a calculating mechanism responsive to data supplied thereto for making certain computations and establishing totals, a support for a record paper, a printing mechanism movably mounted relative to said paper for printing said totals on said paper, said printing mechanism including type members having value-representing impression elements thereon, said value-representing impression elements including a first portion for printing a usual visually readable character and for also printing a machine readable character, an inking means and a supply of magnetic ink for said inking means whereby value-representing deposits of magnetic material are offset by said type members onto said paper, a magnetic pickup relatively movable with respect to said paper to sense said deposits during relative movement between said paper and said pickup and to produce electric signals representative of the values represented by said deposits, and means responsive to said electric signals for entering said values into said calculating mechanism.

15. In a bookkeeping machine using cards having magnetic recordings thereon representing multidigit numbers, in combination, pickup means for sensing magnetic recordings, means for moving one of said cards relative to said pickup means so that the latter successively senses the magnetically recorded digits of a multidigit number magnetically recorded thereon from one end to the other end thereof and produces time displaced electric signal portions having predetermined characteristics associated with the respectively sensed recordings of each digit of the number, data storage means adapted to store digital information represented by said magnetic recordings, means connecting said pickup means to said storage means and responsive to the electric signals produced by said pickup means for entering the digital information represented thereby into said data storage means, marking means having a plurality of said digits thereon and being selectively movable between a plurality of positions, said marking means being adapted to mark on the card in each of said positions a different digit, and operating means connected to said storage means and controlled thereby for moving said marking means between said positions in accordance with the digital information stored in said data storage means and for causing the marking means to mark the card with such digit.